United States Patent
Stuewe et al.

(10) Patent No.: US 6,357,018 B1
(45) Date of Patent: Mar. 12, 2002

(54) METHOD AND APPARATUS FOR DETERMINING CONTINUITY AND INTEGRITY OF A RAMBUS CHANNEL IN A COMPUTER SYSTEM

(75) Inventors: John Stuewe, Cedar Park; Amy C. Nelson, Round Rock, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,704

(22) Filed: Jan. 26, 1999

(51) Int. Cl.$^7$ ................................................. G06F 11/00
(52) U.S. Cl. .............................................. 714/37; 714/43
(58) Field of Search ............................... 714/37, 42, 43

(56) References Cited

U.S. PATENT DOCUMENTS

| | | | |
|---|---|---|---|
| 5,241,643 A | | 8/1993 | Durkin et al. |
| 5,254,883 A | * | 10/1993 | Horowitz ..................... 326/30 |
| 5,276,895 A | | 1/1994 | Grondalski |
| 5,446,696 A | * | 8/1995 | Ware .......................... 365/222 |
| 5,528,553 A | | 6/1996 | Saxena |
| 5,537,355 A | | 7/1996 | Banerjee et al. |
| 5,578,940 A | * | 11/1996 | Dillon ......................... 326/30 |
| 5,623,620 A | | 4/1997 | Fandrich et al. |
| 5,720,031 A | | 2/1998 | Lindsay |
| 5,794,175 A | * | 8/1998 | Conner ....................... 702/119 |
| 5,818,772 A | * | 10/1998 | Kuge ......................... 365/201 |
| 5,862,320 A | * | 1/1999 | Nelson ......................... 714/42 |
| 6,003,121 A | * | 12/1999 | Wirt ........................... 711/710 |
| 6,009,541 A | * | 12/1999 | Liu ............................. 714/36 |
| 6,067,594 A | * | 5/2000 | Perino ........................ 710/126 |
| 6,178,532 B1 | * | 1/2001 | Pierce ......................... 714/718 |
| 6,198,307 B1 | * | 3/2001 | Garlepp ....................... 326/83 |
| 6,226,729 B1 | * | 5/2001 | Stevens ...................... 711/171 |

OTHER PUBLICATIONS

"Rambus Memory: Multi–Gigabytes/Second And Minimum System Cost" 4 pages.

"Memory Latency Comparison" Rambus Inc., Sep. 6, 1996, 8 pages.

"Direct Rambus" Technology Disclosure, Oct. 15, 1997, 16 pages.

* cited by examiner

Primary Examiner—Robert Beausoleil
Assistant Examiner—Bryce P. Bonzo
(74) Attorney, Agent, or Firm—Haynes and Boone, LLP

(57) ABSTRACT

A computer system includes at least one processor, at least one memory, and a device for performing a prescribed continuity and integrity check of a memory bus channel having a serial topology. In one embodiment, basic input output system (BIOS) firmware is stored in memory and includes instructions for causing the processor to perform the prescribed continuity and integrity check of the memory bus channel having a serial topology.

23 Claims, 2 Drawing Sheets

_(1)_
METHOD AND APPARATUS FOR DETERMINING CONTINUITY AND INTEGRITY OF A RAMBUS CHANNEL IN A COMPUTER SYSTEM

BACKGROUND

The disclosures herein relate generally to computer systems, and more particularly, to determining continuity and integrity of a RAMBUS channel of a computer system workstation.

Currently available SDRAM (synchronous dynamic random access memory) DIMM (dual in-line memory module) subsystems use a parallel topology, such as shown in FIG. 1. The subsystem 10 includes a controller 12, sockets 14, and modules 16 connected in parallel via data, address, control, and clock lines, collectively indicated by reference numeral 18. No specific order is required to populate the sockets of the SDRAM DIMM subsystem. The pin count for each DIMM may include 72 or 168, for example. Any contamination on the contact pins and/or sockets of any one module renders an affected module unusable and/or unreliable. However, the subsystem may still be operable with the use of the remaining modules. Failure of the subsystem may not be completely catastrophic. Diagnosis of which module is faulty and replacement of the faulty module (or cleaning of the module's contacts) is fairly easy to accomplish.

In contrast to SDRAM DIMM subsystems, a RAMBUS memory channel subsystem uses a series topology that is routed through several connectors and modules. Each module may contain at least one, and up to sixteen memory devices per module. Currently available RAMBUS subsystems contain three RAMBUS in-line memory modules (RIMMs). If any module or signal connector of the subsystem is not connected properly, then the RAMBUS subsystem will fail (i.e., not operate). In addition, if an improper connection occurs in either a clock line, a control line, or a data line, then the RAMBUS channel will also fail. Furthermore, in the event of the occurrence of an improper connection, the RAMBUS channel loses its integrity. A computer system having a faulty RAMBUS channel will not be able to boot-up or recognize any memory.

Memory module contact/seating issues are a leading cause of memory channel subsystem factory failures. There is no known way to test the memory module contact/seating of a RAMBUS subsystem other than with the use of standard memory tests. Standard memory module contact/seating testing currently includes visual inspection and memory pattern/functionality testing. Such standard testing methods have proved to be non-efficient for use in a high volume computer manufacturing environment.

It would be desirable to provide an improved method and apparatus for determining a continuity and integrity of a RAMBUS channel in a computer system.

SUMMARY

According to one embodiment, a computer system includes at least one processor, at least one memory, and a device for performing a prescribed continuity and integrity check of a memory bus channel having a serial topology. In addition, basic input output system (BIOS) firmware is stored in memory and includes instructions for causing the processor to perform the prescribed continuity and integrity check of the memory bus channel having a serial topology.

The embodiments of the present disclosure provide a technical advantage of an improved method and apparatus for determining a continuity and integrity of a RAMBUS channel in a computer system.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

Figure 2:
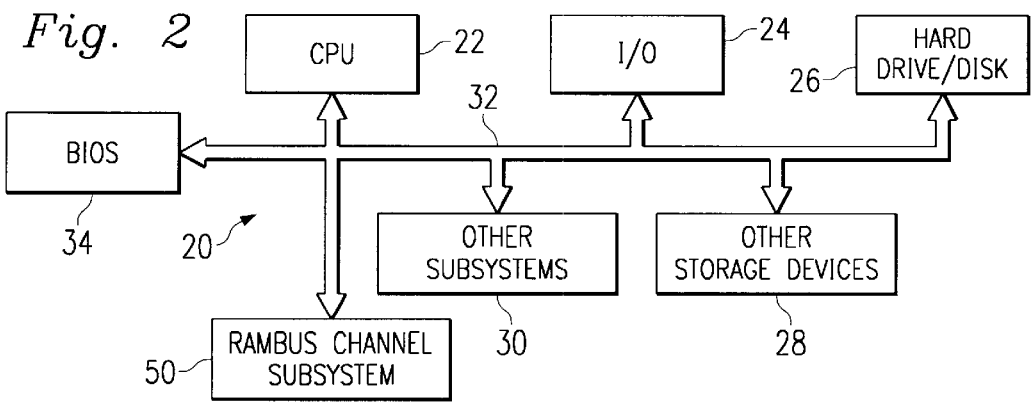
FIG. 2 illustrates a block diagram of a computer system having means for implementing a continuity and integrity check of a memory bus channel having a serial topology according to one embodiment of the present disclosure.

Referring now to FIG. 2, a system block diagram of a computer system 20 is shown having features in accordance with the present embodiments as discussed herein. The computer system 20 includes a central processing unit (CPU) 22, input/output (I/O) devices, such as a display, a keyboard, a mouse, and associated controllers, collectively designated by a reference numeral 24, a hard disk drive 26, and other storage devices, such as a may include a floppy disk drive, CD-rom drive, and the like, collectively designated by a reference numeral 28, various other subsystems, collectively designated by a reference numeral 30, and a memory bus subsystem 50 having a serial topology, all interconnected via one or more buses, shown collectively in FIG. 2 as a bus 32. Computer system 20 further includes basic input output system (BIOS) 34 stored in memory, for example, a non-volatile flash memory that is a separate subsystem than the memory bus subsystem being tested, further as discussed herein.

Figure 1:
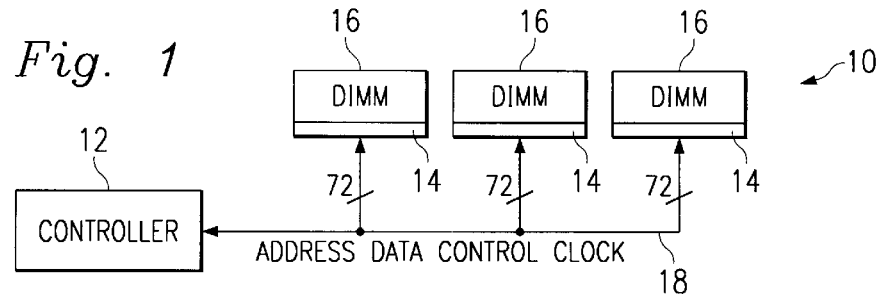
FIG. 1 illustrates a known memory bus channel having a parallel topology.
Figure 3:
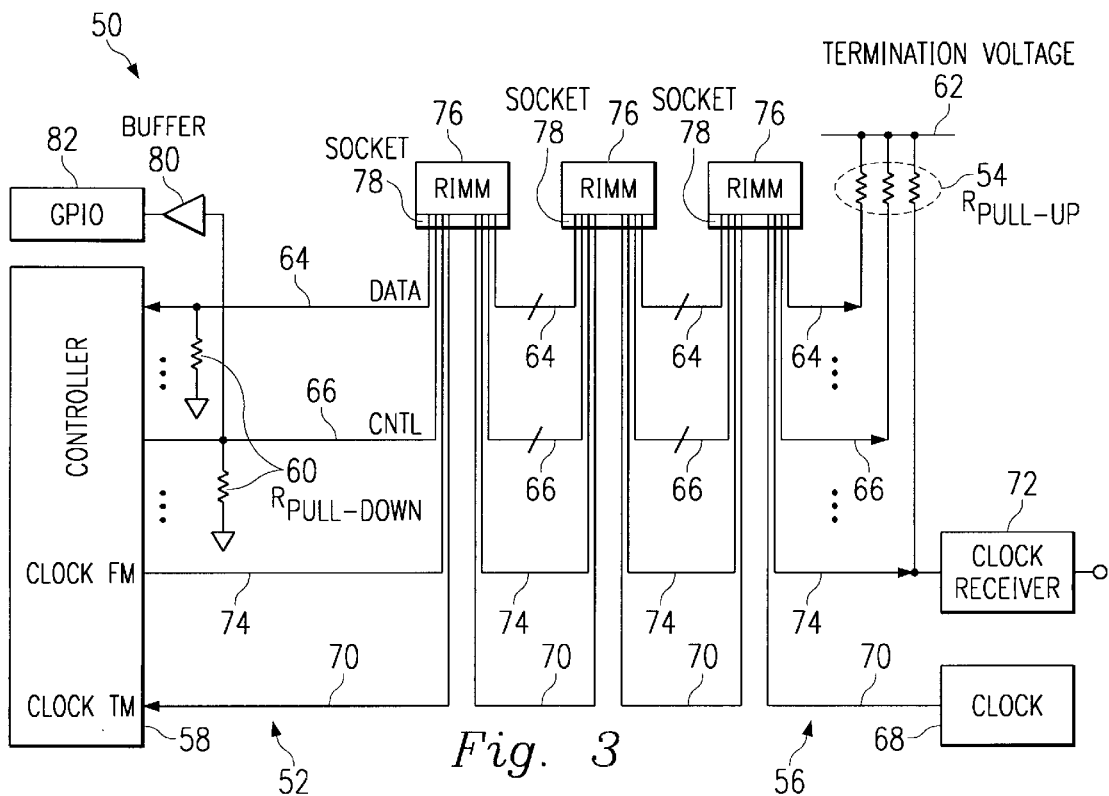
FIG. 3 illustrates a memory bus channel having a serial topology of the computer system of FIG. 1.

Turning now to FIG. 3, memory bus subsystem 50 of FIG. 1 includes a RAMBUS channel. With the termination scheme and series nature of the RAMBUS channel 50, the present embodiments make use of sensing a source end 52 of the RAMBUS channel 50 to determine a continuity of the respective RAMBUS channel, i.e., to determine if the channel is contiguous. The RAMBUS specification calls out for termination pull-up resistors 54 on each signal line at a far or termination end 56 of the RAMBUS channel 50, distal from a RAMBUS memory controller 58. The present embodiments include the use of weak pull-down resistors 60 on select signal lines at the source end 52 of the RAMBUS channel 50, proximate the memory controller 58. During continuity and integrity checking, with a properly configured and functioning RAMBUS channel, the voltage of a signal line at the source end 52 will be pulled high. On any signal line which is not contiguous (i.e., to the termination pull-up resistor 54 and termination voltage 62), the voltage on the signal line at the source end 52 will be low, which is indicative of a continuity failure. The voltage on each signal line can be sensed and a failure reported if any low voltages are detected during a continuity and integrity check.

With respect to the memory channel subsystem, the RAMBUS protocol includes eighteen (18) data bits on data lines 64. The eighteen data bits on data lines 64 can be sensed directly from the RAMBUS memory controller. Further according to the present embodiments, external latches are included for use in sensing the voltage on the control lines 66 during a continuity and integrity check. The protocol includes control lines 66 made up of five (5) column and three (3) row address strobes. EEPROM and CMOS configuration signals (not shown) of the RAMBUS channel subsystem are not sensed by the present embodiments, as corresponding signal connections for the same are made in parallel and thus not subject to being checked by the embodiments of the present disclosure.

With respect to the clock signal, a clock generator 68 provides a RAMBUS clock which starts at the termination end 56 of the channel 50, goes to the source end 52 of the channel through the RAMBUS memory controller 58, and then back out to the termination end 56 of the RAMBUS channel 50. To test for continuity on the clock signal line, the memory controller 58 is used with respect to the forward clock signal (ClockTM) on clock signal line 70 and a receiver 72, placed on the returning clock signal line 74 at the termination end 56 of the channel, is used with respect to the returning clock signal (ClockFM). During a continuity and integrity check, if a clock is not received at either the memory controller 58 or the clock receiver 72 on the RAMBUS channel, then there is either a bad clock or a bad connection.

Testing for continuity and integrity of a RAMBUS channel preferably occurs each time the computer system is powered on. The RAMBUS in-line memory modules (RIMM) 76 are disposed upon a motherboard (not shown) in suitable sockets and/or connectors 78. During an initial manufacture of the computer system, it is important to insure that the computer system is operational. Testing of the integrity of the RAMBUS memory channel subsystem 50 provides an indication of the computer system's operability. During its product lifetime, a computer system may be upgraded and/or be moved to different physical locations. In either case, it is also important to verify an integrity of the RAMBUS channel during the computer's product lifetime. It is highly likely that a computer user may perform an upgrade in the field. The computer user may also move the computer system from one physical location to another physical location. The computer system is thus subject to becoming impaired through a failure in the RAMBUS channel (i.e., such as by contamination and/or faulty or loose socket connections).

The present continuity and integrity check embodiments are preferably initiated (implemented) when the computer system is powered on and there is an initialization of all the system memory. Prior to initializing the memory, the RAMBUS channel is checked to verify that the RAMBUS channel is in tact (i.e., the channel has integrity). An error message appropriate for a given type of detected memory failure could then be issued to a computer user. That is, there are different types of memory failures. A suitable error message may be issued upon detection of a given error condition. For instance, if it is determined that a RAMBUS channel does not exist where one should appear, then a message could be issued to the computer user indicating that a memory module may not be plugged in correctly. An error message might also indicate a specific line and potential remedy, for example, address bit four of the RAMBUS channel is not connected, please clean the contacts. The present embodiments are particularly useful with respect to socket based RAMBUS channels. The present embodiments of checking an integrity and continuity of a RAMBUS channel are preferably incorporated into a computer system having a socket based RAMBUS channel subsystem. The RAMBUS channel may also include an upgradeable channel and/or modular channel.

The present embodiments furthermore detect a validity of input and output connections for each RIMM, along with respective conductive traces which connect the RIMMs together to form the RAMBUS channel. With a RAMBUS channel, there are three different groups of signals which can be tested. The main groups of signals include data signals 64, control signals 66, and clock signals (70,74). Another group of signals of the RAMBUS channel includes CMOS signals, which make up a small subset of the total RAMBUS channel signals and are routed in parallel. The CMOS signals are thus not subject to being verified with the embodiments of the present disclosure.

The RAMBUS memory channel subsystem includes a RAMBUS memory controller, socket/connector interfaces to each module, conductive traces on each module, a termination voltage, and a clock. A maximum level of integrity check would include an integrity check of all data, control, and clock lines. A reduced level of integrity check can include checking an integrity of any subset or combination of the data, control, and clock lines, less than all the data, control, and clock lines. For example, a reduced level of integrity check may include checking an integrity of at least one of the following selected from the group consisting of a data line, a control line, and a clock line.

The present embodiments may be characterized as including three levels of difficulty, each level of difficulty having corresponding implementation costs, to verify a continuity and integrity of the three different groups of data lines, control lines, and clock lines, respectively. Verifying a continuity of a data line is more readily accomplished than verifying a continuity and integrity of a clock line. Verification of continuity and integrity of a control line is intermediate the data line verification and the clock line verification.

In further discussion thereof, the voltage level of a data line, whether "high" or "low", can be read by the RAMBUS memory controller. At the termination end of the RAMBUS channel, opposite the RAMBUS memory controller, the channel includes pull-up resistors coupled to a termination voltage. For each data line, a weak pull-down resistor is placed in the RAMBUS channel at the source end proximate the controller. In an instance wherein the RAMBUS channel is continuous for the data line, then the voltage level at the weak pull-down resistor will be read by the memory controller as a high level. If a high level is not detected by the memory controller, then the channel is determined to be non-contiguous for the data line, i.e., the channel lacks integrity. Thus, with pull-down resistors, one each on a respective data line, the data lines of the RAMBUS channel can be sensed and an integrity thereof readily checked.

In one embodiment, the RAMBUS channel includes eighteen data lines. During a continuity and integrity check, the data lines are readable by the RAMBUS memory controller. The RAMBUS memory controller can operate in a prescribed manner for carrying out the reading of a level of any desired data line.

The weak pull-down resistor (Rpull-down) 60 preferably includes a resistor having a very high resistance, for example, in a range on the order of from 1 kOhms to 50 kOhms (or even 100 kOhms). Preferably, the resistance of Rpull-down is high, so as to minimize any disturbance or adverse effects on the channel during a normal usage of the RAMBUS channel. The pull-up resistor 54 can include a resistor (Rpull-up) having a low resistance, for example, on the order of 25 ohms to 50 ohms. Typically, the pull-up resistor, Rpull-up, is on the order of 27 ohms. With Rpull-up<<Rpull-down, and with the presence of a contiguous channel, Rpull-up dominates and pulls the respective line high at the source end of the channel. If the channel is not contiguous, then the line goes low at the source end of the channel with the use of the weak pull-down resistor. The Rpull-up resistance value is preferably much less that the Rpull-down resistance value, for example, at least one order of magnitude less.

With respect to the control lines 66, the control lines have a same topology as the data lines. Each control line 66 includes a pull-up resistor 54, Rpull-up, coupled between a distal end of a control line and a termination voltage. Weak pull-down resistors 60 are coupled between each control line 66 and ground potential at the source end 52 of the RAMBUS channel, proximate the memory controller 58. The pull-up resistors 54 and weak pull-down resistors 60 can include resistance values similar to those resistors associated with the data lines 64. Unlike the data lines, the memory controller 58 can not read a state of the control lines 66. The memory controller can only write data out to the control lines. To check the state of the control lines, any suitable buffer, latch, or high input impedance device 80 (hereafter referred to only as a buffer, for simplicity) is included or coupled to a respective control line, proximate the weak pull-down resistor 60 and the memory controller. Buffers, latches, and high input impedance devices are known in the art and thus not discussed in detail herein. The buffer 80 enables the level present on a respective control line to be detected during a continuity and integrity check without causing any adverse loading of a respective control line during a normal usage of the channel. The buffer enables a signal on a respective control line to the detected and/or made readable by the computer system outside the RAMBUS controller. In one embodiment, the RAMBUS channel includes eight control lines, including, for example, address lines. Eight weak pull-down resistors and eight buffers (latches, or high input impedance devices) are used in the determining of a continuity and integrity of the RAMBUS channel control lines. Checking a continuity and integrity of the control lines can be carried out in a similar manner as that discussed above with respect to checking the continuity and integrity of the data lines, with the exception of reading the level or state of the control lines via a respective buffer. Any suitable device 82 may be used for enabling a reading of the level information of a desired control line. For example, a general purpose input output (GPIO) device 82 may be used.

With respect to the clock lines, the clock lines include a clock TM line 70 and a clock FM line 74. The clock TM (clock to master) line 70 is a clock line disposed between a clock generator 68, through the RIMM modules 76, and onto the RAMBUS memory controller 58. The clock TM line is further routed into and through the RAMBUS controller and exits as the clock FM (clock from master) line 74. The clock FM line 74 is disposed between the RAMBUS controller 58, the RIMM modules 76, and a pull-up resistor 54 coupled to a termination voltage 62. The clock signal is used for providing prescribed clocking of the RIMM modules 76. Stated another way, the clock generator 68 provides a clock to master clock signal (ClockTM) through the RIMM modules to the RAMBUS memory controller. The clock is further routed from the RAMBUS memory controller, through the RIMM modules, to a pull-up resistor and termination voltage at the termination end of the RAMBUS channel as a clock from master clock signal (ClockFM). The RAMBUS memory controller is controlled in a prescribed manner for detecting a validity of the ClockTM signal. In other words, the RAMBUS memory controller can be used for detecting a presence or absence of the ClockTM signal. In a preferred embodiment, no external level sensing means is included for sensing a level of the ClockTM line. The ClockFM signal which exits the RAMBUS memory controller, passes through the RIMM modules and onto the termination voltage, is sensed by the use of a suitable clock receiver 72 disposed between a farthest RIMM in the sequence of RIMMs and the pull-up resistor 54. Sensing of the ClockFM signal thus occurs at the termination end of the RAMBUS channel.

Figure 4A:
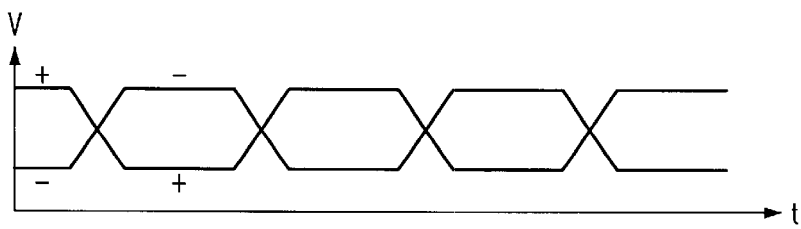
FIGS. 4A, 4B, and 4C illustrate an exemplary differential clock waveform, clock receiver, and clock generator for use with the computer system of FIG. 1.
Figures 4B, 4C:
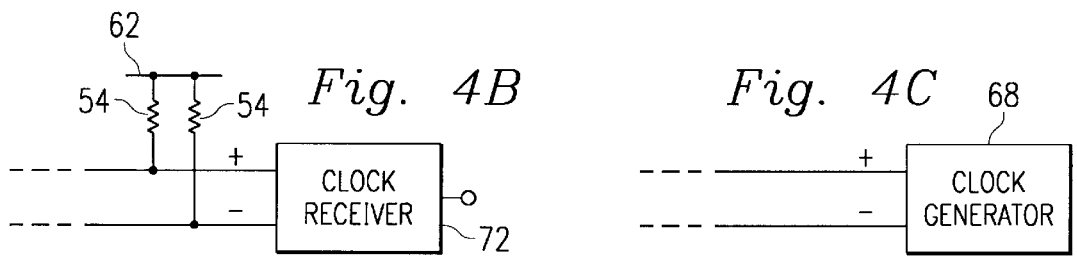

Further with respect to the clock, the clock generator includes any clock generator known in the art for providing suitable clock signals for use with the RAMBUS memory channel subsystem. For example, the clock generator may include a differential clock, having positive and negative clock signals. FIG. 4A illustrates exemplary differential clock signals, including positive and negative clock signals. During a normal operation, at the intersection of positive and negative clock signals, data is clocked on the RAMBUS memory channel. In FIG. 4B, the clock receiver includes positive and negative ClockFM signal inputs and the clock generator of FIG. 4C provides positive and negative ClockTM signals.

The clock receiver 72 preferably includes a suitable high input impedance buffer and circuitry for detecting a presence or absence of the ClockFM signal. The clock receiver further includes any suitable detection circuitry which does not adversely affect the positive and negative clock lines, (e.g., skew) and which isolates the positive and negative clocks for further usage in the determination of a continuity and integrity of the RAMBUS channel ClockFM clock line. Each positive clock line and negative clock line have a pull-up resistor attached thereto (only one shown in FIG. 3 for simplicity), the pull-up resistors further being coupled to a termination voltage. Furthermore, the clock receiver may include, for example, a buffered resistive-capacitive (RC) integrator having an output which is a function of a differential input, the output providing an indication of a presence or absence of the differential clock signal ClockFM. In addition, a GPIO port may be provided for sensing the clock receiver output at the termination end of the RAMBUS channel.

In summary, for detection of continuity and integrity of the data lines in the RAMBUS channel, weak pull-down resistors are used. With respect to control lines, weak pull-down resistors and corresponding buffers at the source end of the channel proximate the RAMBUS controller are used. Lastly, for the clock lines, the memory controller and detection circuitry are used. With all three detection measures of data, control, and clock, the RAMBUS memory channel subsystem can be fully checked for continuity and integrity. Potential contamination may be isolated to one or two fingers of a RIMM socket or connector and the occurrence thereof can be readily determined with the present embodiments. If a clock line does not have continuity or integrity throughout the RAMBUS memory channel subsystem, the RAMBUS memory channel subsystem will not function. The present embodiments provide an efficient method for determining the continuity and integrity of the clock line.

The present embodiments overcome the visual inspection deficiencies of prior methods. The present embodiments enable the detection and determination of which signal lines (data, control, or clock) of the RAMBUS memory channel subsystem are faulty and/or in need of correction. The present embodiments furthermore enable the detection of a fault in the memory subsystem to be readily detected, diagnosed, and provide guidance for its remedy. In one implementation of a RAMBUS memory channel subsystem, there exists on the order of 6 connections on each data and control line and 12 connections on both combined clock lines (i.e., 6 on ClockTM and 6 on ClockFM) which could possibly produce a bad or faulty connection.

The present embodiments thus enable the continuity and integrity checking of three independent sets of signal lines (data, control, and clock) in any given combination as desired for a particular RAMBUS channel application. Suitable program code stored in memory, such as ROM, can be implemented via the computer system basic input output system (BIOS) firmware and the processor for carrying out a prescribed continuity and integrity check of the RAMBUS memory channel subsystem.

Figure 5:
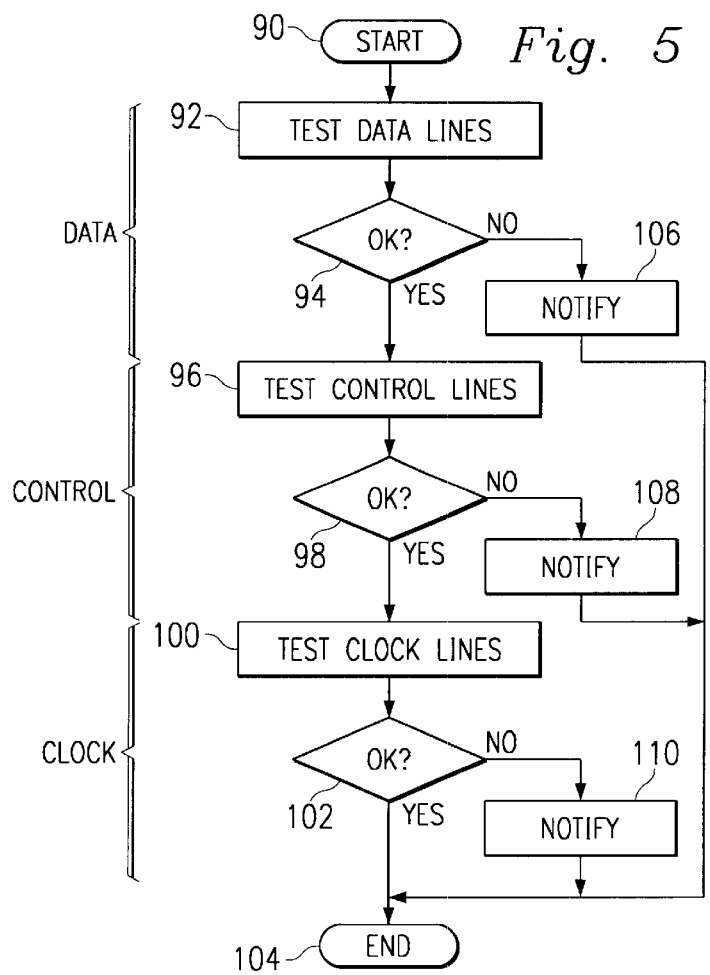
FIG. 5 is a flow diagram of the an exemplary continuity and integrity check of a memory bus channel having a serial topology according to one embodiment of the present disclosure.

With reference now to FIG. 5, one embodiment of a method of checking a continuity and integrity of a RAMBUS channel shall now be discussed. The continuity and integrity check of the RAMBUS channel can include checking of the data lines, control lines, and clock lines. Beginning with step 90, the computer system is powered on. In step 92, the data lines are tested. In step 94, an inquiry is made as to whether or not the data lines tested okay. If the data lines tested okay, then the process proceeds to step 96. In step 96, the control lines are tested. In step 98, an inquiry is made as to whether or not the control lines tested okay. If the control lines tested okay, then the process proceeds to step 100. In step 100, the clock lines are tested. In step 102, an inquiry is made as to whether or not the clock lines tested okay. If the clock lines tested okay, then the continuity and integrity check of the RAMBUS channel is completed at step 104. Returning to step 94, if the data lines did not all test okay, then the process continues with step 106. In step 106, an appropriate notification is issued for signaling that the continuity and integrity check of the data lines failed. Subsequent to step 106, the process ends at step 104. Returning to step 98, if the control lines did not all test okay, then the process continues with step 108. In step 108, an appropriate notification is issued for signaling that the continuity and integrity check of the control lines failed. Subsequent to step 108, the process ends at step 104. Returning to step 102, if the clock lines did not all test okay, then the process continues with step 110. In step 110, an appropriate notification is issued for signaling that the continuity and integrity check of the clock lines failed. Subsequent to step 110, the process ends at step 104.

With respect to the method of FIG. 5, a more detailed discussion of the steps is as follows. When the computer system having the RAMBUS memory channel subsystem is powered on, the BIOS executes a boot-up routine. The boot-up routine is typically stored in ROM (as opposed to the memory subsystem). The boot-up routine includes initializing the memory subsystem to insure that none of the memory chips are driving data (i.e., to insure that the memory chips are idle). The boot-up routine then reads the data lines via the memory controller to insure that nothing is being read back from the memory subsystem. If the data lines are all in a high state (i.e., logical "1"), then it indicates that all of the data lines are being pulled high on the RAMBUS channel by the respective pull-up resistors. The data line continuity and integrity is thus confirmed. In this instance, the weak pull-down resistors at the beginning of the channel were not needed. However, if seventeen "1's" are detected and one "0", then it indicates that one of the data lines is not continuous all the way to the termination voltage. In addition, if all "0's" were detected, then none of the data lines is continuous all the way to the termination voltage. Furthermore, in such an instance, it is highly likely that a RIMM module may not be plugged in at all, since the probability of having all "0's" is typically very low. Different error reports may be issued depending upon a total number of "0's" (i.e., opens) detected. If the data line continuity and integrity test okay, then the process continues with a testing of a next set or sets of signal lines (e.g., control and/or clock). If a problem during data line continuity and integrity check was discovered, then the testing is stopped and an appropriate error signal and/or report is generated or issued. An error report may include a beep code, the illumination of an LED on a system board, or any other suitable visual or audio indication as may be desired for a particular RAMBUS channel continuity and integrity check application. Such an error report provides notification to a computer system operator or user that a problem exists in the data lines of the RAMBUS channel.

The control and clock lines are tested in a manner similar to that discussed above with respect to testing a continuity and integrity of the data lines. With the control and clock lines, reading a state on a respective line is accomplished with the use of a prescribed GPIO port, latch, buffer, or via the controller, whatever the case may be for the given control or clock line. With respect to the data lines, the RAMBUS memory controller has an ability to read and write onto the data lines. With respect to the control lines, the RAMBUS memory controller can only write to the control lines, thus suitable buffers and GPIO ports are used for reading of the control lines. With respect to the clock, at the terminal end of the channel, the presence or absence of the ClockFM clock could be indicated by a high or low (e.g., "1" or "0") at an output of the clock receiver. At the source end proximate the memory controller, the presence or absence of the ClockTM clock can be detected by the memory controller. The BIOS boot-up routine includes suitable instructions for causing the processor to interact with and/or control the RAMBUS memory controller, in addition to the reading of select GPIO ports, latches, and buffers in a manner for carrying out a prescribed continuity and integrity check of the RAMBUS channel. Reading of any given RAMBUS channel signal line depends upon how the detection of a respective signal line is implemented. A continuity and integrity check routine may further be included as part of a power on self test (POST) of the given computer system. Implementations other than those specifically discussed herein are possible. For example, a continuity and integrity check may include only the data and control lines, but not the clock lines. Any combination and order of the data, control, and clock lines may be tested as desired for a particular continuity and integrity check.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system comprising:

at least one processor;

at least one memory;

basic input output system (BIOS) firmware stored in said at least one memory, said BIOS firmware including instructions for causing said at least one processor to perform a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein said memory bus channel further includes a memory bus controller and a clock generator, the memory bus controller being disposed at the first end of said memory bus channel and the clock generator being disposed at the termination end of said memory bus channel, further wherein at least one memory module is disposed in said memory bus channel in a serial manner from the first end to the termination end, wherein each data line includes a pull-down resistor coupled between the data line and a ground potential, the pull-down resistor further being coupled to the data line at a position in-between the memory bus controller and a first memory module of said memory bus channel, wherein each data line further includes a pull-up resistor coupled between the data line and a termination voltage potential at the termination end of said memory bus channel, and further wherein a state of a respective data line can be read by the memory controller during the continuity and integrity check of the data line.

2. The computer system of claim 1, wherein said memory bus channel further includes at least one socket serially disposed in said memory bus channel between the first end and the termination end, each socket being suitable for receiving a memory module.

3. A computer system comprising:

at least one processor;

at least one memory;

basic input output system (BIOS) firmware stored in said at least one memory, said BIOS firmware including instructions for causing said at least one processor to perform a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein said memory bus channel further includes a memory bus controller and a clock generator, the memory bus controller being disposed at the first end of said memory bus channel and the clock generator being disposed at the termination end of said memory bus channel, further wherein at least one memory module is disposed in said memory bus channel in a serial manner from the first end to the termination end, wherein each control line includes a pull-down resistor coupled between the control line and a ground potential, the pull-down resistor further being coupled to the control line at a position in-between the memory bus controller and a first memory module of said memory bus channel, wherein each control line further includes a pull-up resistor coupled between the control line and a termination voltage potential at the termination end of said memory bus channel, and further wherein a buffer is coupled to each control line proximate the pull-down resistor for enabling a reading of a state of a respective control line during the continuity and integrity check of the control line.

4. A computer system comprising:

at least one processor;

at least one memory;

basic input output system (BIOS) firmware stored in said at least one memory, said BIOS firmware including instructions for causing said at least one processor to perform a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein said memory bus channel further includes a memory bus controller and a clock generator, the memory bus controller being disposed at the first end of said memory bus channel and the clock generator being disposed at the termination end of said memory bus channel, further wherein at least one memory module is disposed in said memory bus channel in a serial manner from the first end to the termination end, wherein the memory controller is used for detecting a presence or absence of the clock signal transmitted from the clock generator to the memory controller on a Clock TM clock line in response to the continuity and integrity check of the Clock TM clock line, and wherein said memory bus channel further includes a clock receiver, the clock receiver coupled to a Clock FM clock line and disposed at the termination end of said memory bus channel, the clock receiver having a pull-up resistor coupled between the Clock FM clock line and a termination voltage potential at the termination end of said memory bus channel, wherein a state of the clock line can be read by the clock receiver for detecting a presence or absence of the clock signal transmitted from the memory controller to the termination end of said memory bus channel in response to the continuity and integrity check of the clock FM clock line.

5. A computer system comprising:

at least one processor;

at least one memory;

basic input output system (BIOS) firmware stored in said at least one memory, said BIOS firmware including instructions for causing said at least one processor to perform a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein said memory bus channel further includes at least one socket disposed in said memory bus channel in a serial manner from the first end to the termination end, each socket being suitable for receiving a memory module, and wherein said memory bus channel further includes a memory bus controller and a clock generator, the memory bus controller being disposed at the first end and the clock generator being disposed at the termination end, wherein each data line includes a pull-down resistor coupled between the data line and a ground potential, the pull-down resistor further being coupled to the data line at a position in-between the memory bus controller and a first memory module of said memory bus channel, wherein each data line further includes a pull-up resistor coupled between the data line and a termination voltage potential at the termination end of said memory bus channel, and further wherein a state of a respective data line can be read by the memory controller during the continuity and integrity check of the data line.

6. A computer system comprising:

at least one processor;

at least one memory;

basic input output system (BIOS) firmware stored in said at least one memory, said BIOS firmware including instructions for causing said at least one processor to perform a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein said memory bus channel further includes at least one socket disposed in said memory bus channel in a serial manner from the first end to the termination end, each socket being suitable for receiving a memory module, and wherein said memory bus channel further includes a memory bus controller and a clock generator, the memory bus controller being disposed at the first end and the clock generator being disposed at the termination end, wherein each control line includes a pull-down resistor coupled between the control line and a ground potential, the pull-down resistor further being coupled to the control line at a position in-between the memory bus controller and a first memory module of said memory bus channel, wherein each control line further includes a pull-up resistor coupled between the control line and a termination voltage potential at the termination end of said memory bus channel, and further wherein a buffer is coupled to each control line proximate the pull-down resistor for enabling a reading of a state of a respective control line during the continuity and integrity check of the control line.

7. A computer system comprising:

at least one processor;

at least one memory;

basic input output system (BIOS) firmware stored in said at least one memory, said BIOS firmware including instructions for causing said at least one processor to perform a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein said memory bus channel further includes at least one socket disposed in said memory bus channel in a serial manner from the first end to the termination end, each socket being suitable for receiving a memory module, and wherein said memory bus channel further includes a memory bus controller and a clock generator, the memory bus controller being disposed at the first end and the clock generator being disposed at the termination end, wherein the memory controller is used for detecting a presence or absence of the clock signal transmitted from the clock generator to the memory controller on a Clock TM clock line in response to the continuity and integrity check of the Clock TM clock line, and wherein said memory bus channel further includes a clock receiver, the clock receiver coupled to a Clock FM clock line and disposed at the termination end of said memory bus channel, the clock receiver having a pull-up resistor coupled between the Clock FM clock line and a termination voltage potential at the termination end of said memory bus channel, wherein a state of the clock line can be read by the clock receiver for detecting a presence or absence of the clock signal transmitted from the memory controller to the termination end of said memory bus channel in response to the continuity and integrity check of the clock FM clock line.

8. A computer system comprising:

at least one processor;

at least one memory;

means for performing a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein each data line includes a pull-down resistor coupled between the data line and a ground potential, the pull-down resistor further being coupled to the data line at a position in-between the memory bus controller and a first memory module of said memory bus channel, wherein each data line further includes a pull-up resistor coupled between the data line and a termination voltage potential at the termination end of said memory bus channel, and further wherein a state of a respective data line can be read by the memory controller during the continuity and integrity check of the data line.

9. The computer system of claim 8, wherein said memory bus channel further includes at least one socket serially disposed in said memory bus channel between the first end and the termination end, each socket being suitable for receiving a memory module.

10. The computer system of claim 8, wherein said continuity and integrity check performing means includes basic input output system (BIOS) firmware, the BIOS firmware being stored in said at least one memory and including instructions for causing said at least one processor to perform the prescribed continuity and integrity check of the memory bus channel.

11. A computer system comprising:

at least one processor;

at least one memory;

means for performing a prescribed continuity and integrity check of a memory bus channel having a serial topology; and memory bus channel having a serial topology, said memory bus channel including data lines, control lines, and clock lines extending from a first end of said memory bus channel to a termination end of said memory bus channel opposite the first end, wherein each control line includes a pull-down resistor coupled between the control line and a ground potential, the pull-down resistor further being coupled to the control line at a position in-between the memory bus controller and a first memory module of said memory bus channel, wherein each control line further includes a pull-up resistor coupled between the control line and a termination voltage potential at the termination end of said memory bus channel, and further wherein a buffer is coupled to each control line proximate the pull-down resistor for enabling a reading of a state of a respective control line during the continuity and integrity check of the control line.

12. A computer system comprising:
at least one processor;
at least one memory;
means for performing a prescribed continuity and integrity check of a memory bus channel having a serial topology; and
memory bus channel having a serial topology, said memory bus channel including data lines, control lines, and clock lines extending from a first end of said memory bus channel to a termination end of said memory bus channel opposite the first end, wherein
the memory controller is used for detecting a presence or absence of the clock signal transmitted from the clock generator to the memory controller on a Clock TM clock line in response to the continuity and integrity check of the Clock TM clock line, and wherein
said memory bus channel further includes a clock receiver, the clock receiver coupled to a Clock FM clock line and disposed at the termination end of said memory bus channel, the clock receiver having a pull-up resistor coupled between the Clock FM clock line and a termination voltage potential at the termination end of said memory bus channel, wherein a state of the clock line can be read by the clock receiver for detecting a presence or absence of the clock signal transmitted from the memory controller to the termination end of said memory bus channel in response to the continuity and integrity check of the clock FM clock line.

13. A computer system comprising:
at least one processor;
at least one memory;
means for performing a prescribed continuity and integrity check of a memory bus channel having a serial topology; and
memory bus channel having a serial topology, said memory bus channel including data lines, control lines, and clock lines extending from a first end of said memory bus channel to a termination end of said memory bus channel opposite the first end, wherein said memory bus channel further includes at least one socket disposed in said memory bus channel in a serial manner from the first end to the termination end, each socket being suitable for receiving a memory module, and wherein said memory bus channel further includes a memory bus controller and a clock generator, the memory bus controller being disposed at the first end and the clock generator being disposed at the termination end, wherein each data line includes a pull-down resistor coupled between the data line and a ground potential, the pull-down resistor further being coupled to the data line at a position in-between the memory bus controller and a first memory module of said memory bus channel, wherein each data line further includes a pull-up resistor coupled between the data line and a termination voltage potential at the termination end of said memory bus channel, and further wherein a state of a respective data line can be read by the memory controller during the continuity and integrity check of the data line.

14. A computer system comprising:
at least one processor;
at least one memory;
means for performing a prescribed continuity and integrity check of a memory bus channel having a serial topology; and
memory bus channel having a serial topology, said memory bus channel including data lines, control lines, and clock lines extending from a first end of said memory bus channel to a termination end of said memory bus channel opposite the first end, wherein said memory bus channel further includes at least one socket disposed in said memory bus channel in a serial manner from the first end to the termination end, each socket being suitable for receiving a memory module, and wherein said memory bus channel further includes a memory bus controller and a clock generator, the memory bus controller being disposed at the first end and the clock generator being disposed at the termination end, wherein each control line includes a pull-down resistor coupled between the control line and a ground potential, the pull-down resistor further being coupled to the control line at a position in-between the memory bus controller and a first memory module of said memory bus channel, wherein each control line further includes a pull-up resistor coupled between the control line and a termination voltage potential at the termination end of said memory bus channel, and further wherein a buffer is coupled to each control line proximate the pull-down resistor for enabling a reading of a state of a respective control line during the continuity and integrity check of the control line.

15. A computer system comprising:
at least one processor;
at least one memory;
means for performing a prescribed continuity and integrity check of a memory bus channel having a serial topology; and
memory bus channel having a serial topology, said memory bus channel including data lines, control lines, and clock lines extending from a first end of said memory bus channel to a termination end of said memory bus channel opposite the first end, wherein said memory bus channel further includes at least one socket disposed in said memory bus channel in a serial manner from the first end to the termination end, each socket being suitable for receiving a memory module, and wherein said memory bus channel further includes a memory bus controller and a clock generator, the memory bus controller being disposed at the first end and the clock generator being disposed at the termination end, wherein the memory controller is used for detecting a presence or absence of the clock signal transmitted from the clock generator to the memory controller on a Clock TM clock line in response to the continuity and integrity check of the Clock TM clock line, and wherein said memory bus channel further includes a clock receiver, the clock receiver coupled to a Clock FM clock line and disposed at the termination end of said memory bus channel, the clock receiver having a pull-up resistor coupled between the Clock FM clock line and a termination voltage potential at the termination end of said memory bus channel, wherein a state of the clock line can be read by the clock receiver for detecting a presence or absence of the clock signal transmitted from the memory controller to the termination end of said memory bus channel in response to the continuity and integrity check of the clock FM clock line.

16. A method of operating a computer system comprising:

providing at least one processor;

providing at least one memory;

performing a prescribed continuity and integrity check of a memory bus channel having a serial topology; and providing a memory bus channel having a serial topology, the memory bus channel including data lines, control lines, and clock lines extending from a first end of the memory bus channel to a termination end of the memory bus channel opposite the first end, wherein the memory bus channel further includes a memory bus controller and a clock generator, the memory bus controller being disposed at the first end of the memory bus channel and the clock generator being disposed at the termination end of the memory bus channel, further wherein at least one memory module is disposed in the memory bus channel in a serial manner from the first end to the termination end, wherein each data line includes a pull-down resistor coupled between the data line and a ground potential, the pull-down resistor further being coupled to the data line at a position in-between the memory bus controller and a first memory module of the memory bus channel, wherein each data line further includes a pull-up resistor coupled between the data line and a termination voltage potential at the termination end of the memory bus channel, and further wherein a state of a respective data line can be read by the memory controller during the continuity and integrity check of the data line.

17. The method of claim 16, wherein the memory bus channel further includes at least one socket serially disposed in the memory bus channel between the first end and the termination end, each socket being suitable for receiving a memory module.

18. The method of claim 16, wherein performing the continuity and integrity check includes providing basic input output system (BIOS) firmware, the BIOS firmware being stored in the at least one memory and including instructions for causing the at least one processor to perform the prescribed continuity and integrity check of the memory bus channel.

19. A method of operating a computer system comprising:

providing at least one processor;

providing at least one memory;

performing a prescribed continuity and integrity check of a memory bus channel having a serial topology; and providing a memory bus channel having a serial topology, the memory bus channel including data lines, control lines, and clock lines extending from a first end of the memory bus channel to a termination end of the memory bus channel opposite the first end, wherein the memory bus channel further includes a memory bus controller and a clock generator, the memory bus controller being disposed at the first end of the memory bus channel and the clock generator being disposed at the termination end of the memory bus channel, further wherein at least one memory module is disposed in the memory bus channel in a serial manner from the first end to the termination end, wherein each control line includes a pull-down resistor coupled between the control line and a ground potential, the pull-down resistor further being coupled to the control line at a position in-between the memory bus controller and a first memory module of the memory bus channel, wherein each control line further includes a pull-up resistor coupled between the control line and a termination voltage potential at the termination end of the memory bus channel, and further wherein a buffer is coupled to each control line proximate the pull-down resistor for enabling a reading of a state of a respective control line during the continuity and integrity check of the control line.

20. A method of operating a computer system comprising:

providing at least one processor;

providing at least one memory;

performing a prescribed continuity and integrity check of a memory bus channel having a serial topology; and providing a memory bus channel having a serial topology, the memory bus channel including data lines, control lines, and clock lines extending from a first end of the memory bus channel to a termination end of the memory bus channel opposite the first end, wherein the memory bus channel further includes a memory bus controller and a clock generator, the memory bus controller being disposed at the first end of the memory bus channel and the clock generator being disposed at the termination end of the memory bus channel, further wherein at least one memory module is disposed in the memory bus channel in a serial manner from the first end to the termination end, wherein the memory controller is used for detecting a presence or absence of the clock signal transmitted from the clock generator to the memory controller on a Clock TM clock line in response to the continuity and integrity check of the Clock TM clock line, and wherein the memory bus channel further includes a clock receiver, the clock receiver coupled to a Clock FM clock line and disposed at the termination end of the memory bus channel, the clock receiver having a pull-up resistor coupled between the Clock FM clock line and a termination voltage potential at the termination end of said memory bus channel, wherein a state of the clock line can be read by the clock receiver for detecting a presence or absence of the clock signal transmitted from the memory controller to the termination end of the memory bus channel in response to the continuity and integrity check of the clock FM clock line.

21. A method of operating a computer system comprising:

providing at least one processor;

providing at least one memory;

performing a prescribed continuity and integrity check of a memory bus channel having a serial topology; and providing a memory bus channel having a serial topology, the memory bus channel including data lines, control lines, and clock lines extending from a first end of the memory bus channel to a termination end of the memory bus channel opposite the first end, wherein the memory bus channel further includes at least one socket disposed in the memory bus channel in a serial manner from the first end to the termination end, each socket being suitable for receiving a memory module, and wherein the memory bus channel further includes a memory bus controller and a clock generator, the memory bus controller being disposed at the first end and the clock generator being disposed at the termination end, wherein each data line includes a pull-down resistor coupled between the data line and a ground potential, the pull-down resistor further being coupled to the data line at a position in-between the memory bus controller and a first memory module of the memory bus channel, wherein each data line further includes a pull-up resistor coupled between the data line and a termination voltage potential at the termination end of the memory bus channel, and further wherein a state of a respective data line can be read by the memory controller during the continuity and integrity check of the data line.

22. A method of operating a computer system comprising:

providing at least one processor;

providing at least one memory;

performing a prescribed continuity and integrity check of a memory bus channel having a serial topology; and providing a memory bus channel having a serial topology, the memory bus channel including data lines, control lines, and clock lines extending from a first end of the memory bus channel to a termination end of the memory bus channel opposite the first end, wherein the memory bus channel further includes at least one socket disposed in the memory bus channel in a serial manner from the first end to the termination end, each socket being suitable for receiving a memory module, and wherein the memory bus channel further includes a memory bus controller and a clock generator, the memory bus controller being disposed at the first end and the clock generator being disposed at the termination end, wherein each control line includes a pull-down resistor coupled between the control line and a ground potential, the pull-down resistor further being coupled to the control line at a position in-between the memory bus controller and a first memory module of the memory bus channel, wherein each control line further includes a pull-up resistor coupled between the control line and a termination voltage potential at the termination end of the memory bus channel, and further wherein a buffer is coupled to each control line proximate the pull-down resistor for enabling a reading of a state of a respective control line during the continuity and integrity check of the control line.

23. A method of operating a computer system comprising:

providing at least one processor;

providing at least one memory;

performing a prescribed continuity and integrity check of a memory bus channel having a serial topology; and providing a memory bus channel having a serial topology, the memory bus channel including data lines, control lines, and clock lines extending from a first end of the memory bus channel to a termination end of the memory bus channel opposite the first end, wherein the memory bus channel further includes at least one socket disposed in the memory bus channel in a serial manner from the first end to the termination end, each socket being suitable for receiving a memory module, and wherein the memory bus channel further includes a memory bus controller and a clock generator, the memory bus controller being disposed at the first end and the clock generator being disposed at the termination end, wherein the memory controller is used for detecting a presence or absence of the clock signal transmitted from the clock generator to the memory controller on a Clock TM clock line in response to the continuity and integrity check of the Clock TM clock line, and wherein the memory bus channel further includes a clock receiver, the clock receiver coupled to a Clock FM clock line and disposed at the termination end of the memory bus channel, the clock receiver having a pull-up resistor coupled between the Clock FM clock line and a termination voltage potential at the termination end of said memory bus channel, wherein a state of the clock line can be read by the clock receiver for detecting a presence or absence of the clock signal transmitted from the memory controller to the termination end of the memory bus channel in response to the continuity and integrity check of the clock FM clock line.

* * * * *